(12) United States Patent
Mischler

(10) Patent No.: US 6,210,040 B1
(45) Date of Patent: Apr. 3, 2001

(54) LINEAR-MOVEMENT GUIDE

(75) Inventor: Ernst Mischler, Roggwil (CH)

(73) Assignee: Schneeberger Holding AG, Roggwil (CH)

( * ) Notice: Subject to any disclaimer, the term of this patent is extended or adjusted under 35 U.S.C. 154(b) by 0 days.

(21) Appl. No.: 09/384,087

(22) Filed: Aug. 27, 1999

(30) Foreign Application Priority Data

Aug. 27, 1998 (CH) .................................................. 1754/98

(51) Int. Cl.$^7$ .................................................. F16C 29/06
(52) U.S. Cl. .................................................. 384/45
(58) Field of Search ........................... 384/43, 44, 45

(56) References Cited

U.S. PATENT DOCUMENTS

| | | | |
|---|---|---|---|
| 4,502,737 | * 3/1985 | Osawa | 384/45 |
| 4,688,950 | * 8/1987 | Yokota | 384/44 |
| 4,798,479 | 1/1989 | Morita | 384/45 |
| 5,106,206 | * 4/1992 | Tanaka | 384/45 |
| 5,492,413 | 2/1996 | Tsukada | 384/15 |
| 5,544,954 | * 8/1996 | Osawa | 384/45 |
| 5,727,884 | * 3/1998 | Greiner et al. | 384/45 |

FOREIGN PATENT DOCUMENTS

| | | |
|---|---|---|
| 36 04 283 | 8/1986 | (DE) . |
| 39 31 351 | 3/1991 | (DE) . |
| 0 124 648 | 11/1984 | (EP) . |
| 0 802 337 | 10/1997 | (EP) . |
| 0 845 611 | 6/1998 | (EP) . |

* cited by examiner

Primary Examiner—Thomas R. Hannon
(74) Attorney, Agent, or Firm—Venable; Gabor J. Kelemen

(57) ABSTRACT

A slider of a linear-movement guide, which is provided in a rail-supported arrangement, has a center segment and two legs that respectively adjoin the center segment so that the slider has an essentially U-shaped cross section, and a recess that extends parallel to the axis of longitudinal movement. The slider further has at least one roller-body track in the region of the two legs, with each roller-body track having a return conduit, a support zone and two diversion conduits that connect the return conduit and the support zone to one another. At least one leg has at least one groove, and an insert for diverting the roller bodies is inserted into the groove.

13 Claims, 5 Drawing Sheets

LINEAR-MOVEMENT GUIDE

BACKGROUND OF THE INVENTION

The invention relates to a wagon (also referred to as a slider) of a linear-movement guide, which is provided for a rail-supported arrangement, the wagon having a center section and two legs that adjoin the center section, thereby forming an essentially U-shaped wagon cross section, and a recess that extends parallel to the provided axis of longitudinal movement. In the region of the two legs, the wagon has at least one roller-body track, with each track being provided with a return conduit, a support region and two diversion conduits that connect the return conduit and the support region to one another.

Roller-bearing-type linear guides for roller bearings are used in numerous technological fields in which a component is to be moved in a straight line with respect to another component, and with the lowest possible frictional losses. An example of such applications is machine tools. In this case, the guides have a wagon or a sliding element that is guided on a rail via roller bodies such as balls, rollers or needles. The roller bodies circulate in closed roller-body tracks of the wagon. They typically have a support zone, in which the roller bodies rest against a support surface of the wagon and against the rail, thereby supporting the load to be moved. Due to the linear movement of the wagon, the roller bodies exit the support zone and enter a first diversion conduit, in which the roller bodies are transferred from the support zone into the return conduit. After passing through the return conduit, the roller bodies re-enter the support zone via a second diversion conduit.

In many cases, the diversion conduits are formed by an assembly that is positioned against and secured to the end face of a base body of the wagon, the assembly at least partially including the necessary guide elements for diversion. Usually, this assembly includes the guide elements of all of the diversions disposed at the respective end face. Moreover, a scraper, which is intended to prevent dirt from entering the wagon, can also be integrated into the assembly.

Several miniaturized linear-movement guides are already known; they are frequently used in the field of semiconductor machinery. These linear-movement guides typically have only one roller-body track at one wagon leg, because this permits a reduction in the occurring loads. Otherwise, these linear-movement guides are miniaturized in that the greatly-widened, larger linear-movement guides are realized on a smaller scale, but with essentially no structural changes. The disadvantage of this, however, is that the wagons have a fairly complex structure, because they require a relatively large number of components. Because the production tolerances of the individual components are cumulative, comparatively high manufacturing-precision requirements must be placed on the individual components. Due to the small wagon size, the precision requirements would be easier to meet per se than in larger linear-movement guides, however.

In many of the known linear-movement guides, it is not persuasive that a separate, end-face component must be constructed, finished and possibly supplied for different wagon widths. This is necessary, however, because the endface components, which include guide elements for diversions, are respectively matched to a specific wagon width.

SUMMARY OF THE INVENTION

It is therefore the object of the invention to provide a wagon of a linear-movement guide, particularly for small linear-movement guides, that is structurally simple and can be produced in few steps.

According to the invention, this object is accomplished in a wagon mentioned at the outset in that at least one leg has a groove, and an insert that includes elements for diverting the roller bodies can be inserted into the groove. The invention is not limited to use in a wagon of a linear-movement guide, however. It can also be used in virtually any guide in which roller bodies circulate in a roller-body track having a support region, a return conduit and two diversion conduits that connect the support region and the return conduit to one another.

A particular advantage of the solution according to the invention is that it offers the option of constructing wagons of arbitrary width and length with one and the same diverting body. It is therefore possible to construct wagons of different sizes with fewer different components than before. This reduction in the necessary components significantly lowers production costs.

The base body of a wagon of the invention can be produced especially simply and inexpensively when the at least one groove extends essentially transversely to the recess, the groove being limited by two side surfaces of the base body that are oriented essentially orthogonally to the axis of longitudinal movement. This type of groove can be produced with a conventional milling tool.

The one-piece embodiment of the diverting bodies that are provided for a roller-body track contributes to the reduction in the number of necessary components. It has also proven useful when the diverting bodies are produced in a plastic injection-molding process. These bodies could also comprise steel or other metals in addition to plastic, which can be especially useful for vacuum applications.

A further advantage of the invention is that the forces acting on a diverting body in the diversion region of the roller bodies can be diverted particularly well in the wagons. These forces are predominantly effective parallel to the axis of longitudinal movement. Because the groove provided in the base body of the wagon in accordance with the invention is limited by side walls of the base body that are oriented perpendicular to the axis of longitudinal movement, the forces can be diverted via the side walls. Wagons of the invention can therefore be especially robust.

To further reduce the manufacturing and assembly outlay, it can be useful for the diverting bodies to be embodied as inserts that are to be inserted into the respective groove; these inserts are only secured to the base body by a snap connection.

It has also proven advantageous when the insert is provided with centering elements, with which the diversion conduit to the support zone and the return conduit can be oriented in a predetermined manner.

A further advantage can be attained in that the scrapers are components that are separate from the diverting bodies. This permits an exchange of the scrapers, which are susceptible to wear, without necessitating an exchange of the diverting bodies.

Further preferred embodiments of the invention ensue from the dependent claims.

The invention is described in detail by way of embodiments illustrated in the schematic drawings.

DETAILED DESCRIPTION OF THE PREFERRED EMBODIMENTS

Figure 1:
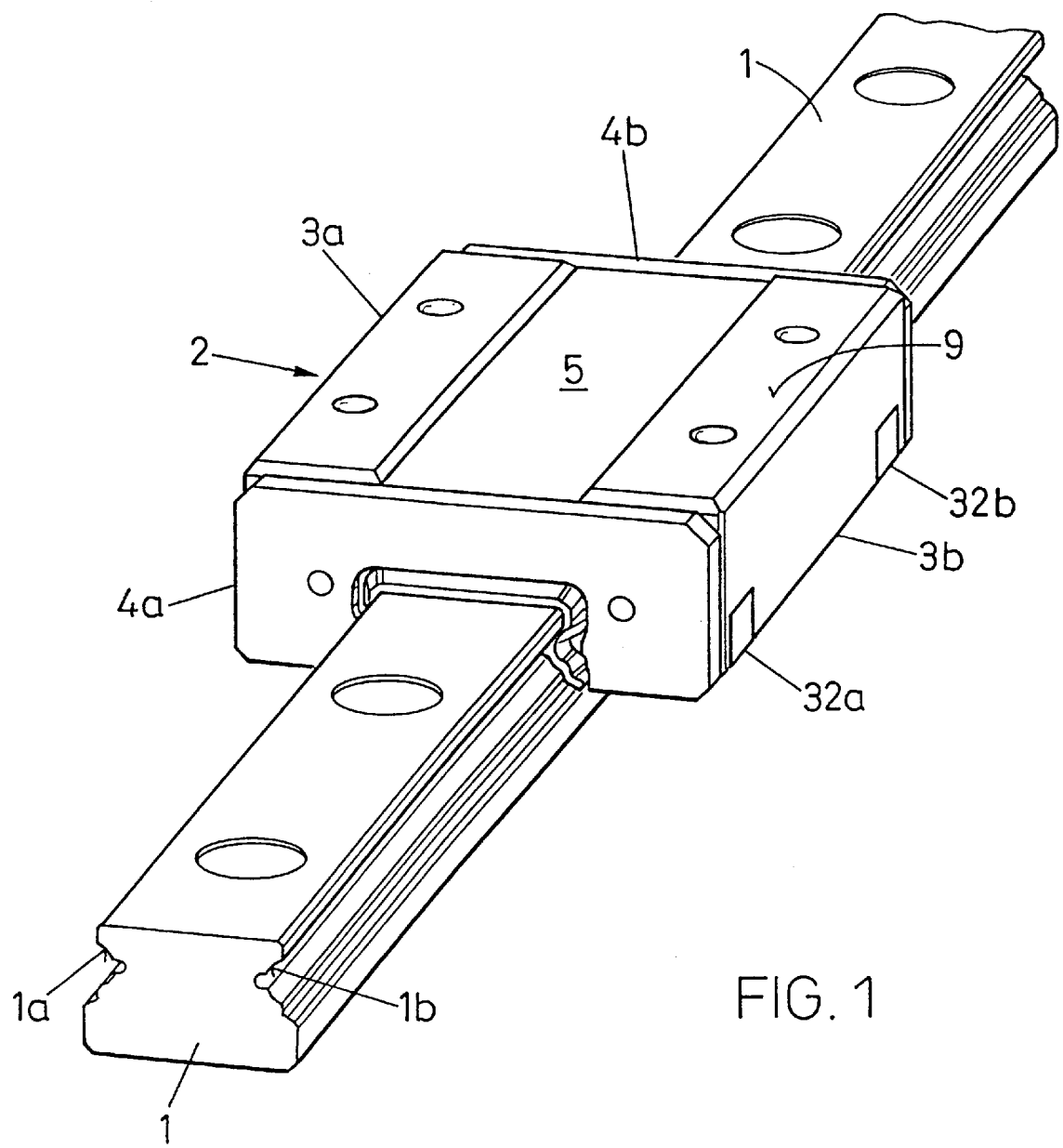
FIG. 1 is a view in perspective of a linear-movement guide of the invention.

FIG. 1 shows a linear-movement guide having a profiled guide rail 1, on which a wagon 2 is supported and disposed to be longitudinally displaced. As can also be seen in FIG. 2, the wagon 2 has an essentially U-shaped cross section, and its legs 3a, 3b adjoining a center segment extend around the rail 1. Cover plates 4a, 4b, which are detachably secured to a metallic base body 5 of the wagon, are mounted to the end faces of the wagon. A top side of the wagon 2 is provided as an assembly surface 9, on which a load to be moved can be secured.

The wagon is supported via roller bodies 7, which are disposed in two closed tracks 6a, 6b, on lateral support surfaces 1a, 1b of the guide rail 1. In the illustrated example, balls are provided as roller bodies 7. The support surfaces 1a, 1b of the rail are profiled, effecting a linear contact between the balls and the guide rail.

Two cylindrical recesses 10a, 10b (FIG. 3) are cut into the metallic base body 5; their respective longitudinal axis extends parallel to the axis of longitudinal movement of the rail 1. Each of these recesses 10a, 10b is a component of one of the roller-body tracks 6a, 6b, which additionally include a support zone 11 and two diversion conduits that connect the ends of the recesses 10a, 10b and the respective support zone. It can be seen in FIG. 2 that a retaining element 16 is provided in the support zone 11, the element being guided, on the one hand, and prevented from falling out of the wagon 2, on the other hand, by the balls provided as roller bodies 7. A retaining element 16 of this type can be a securing yoke 17, as shown in detail in FIG. 4, which has a retaining rib 18 that extends parallel to the axis of longitudinal movement, and two securing ribs 19 that adjoin the ends. The two securing ribs 19 detachably connect the securing yoke 17 to the end faces 8 of the base body 5, for which purpose holding latches 20 of the securing ribs, which extend at the end side and essentially parallel to the retaining rib 18, engage corresponding recesses 21a, 21b of the base body 5. The securing yoke 17 preferably comprises an elastic material.

Figure 2:
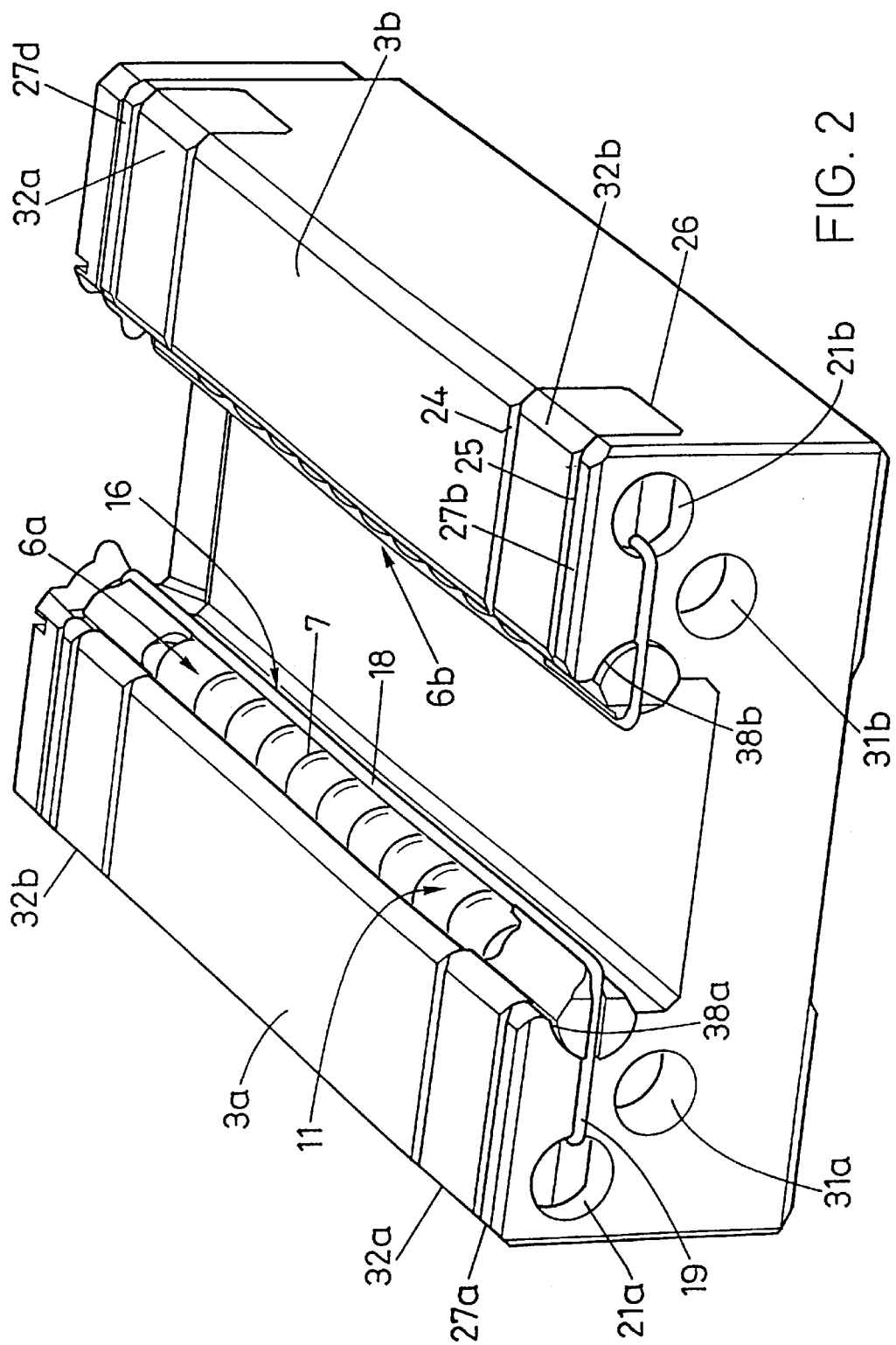
FIG. 2 shows a partially-assembled wagon according to an embodiment of the linear-movement guide according to FIG. 1, in a partial view.
Figure 3:
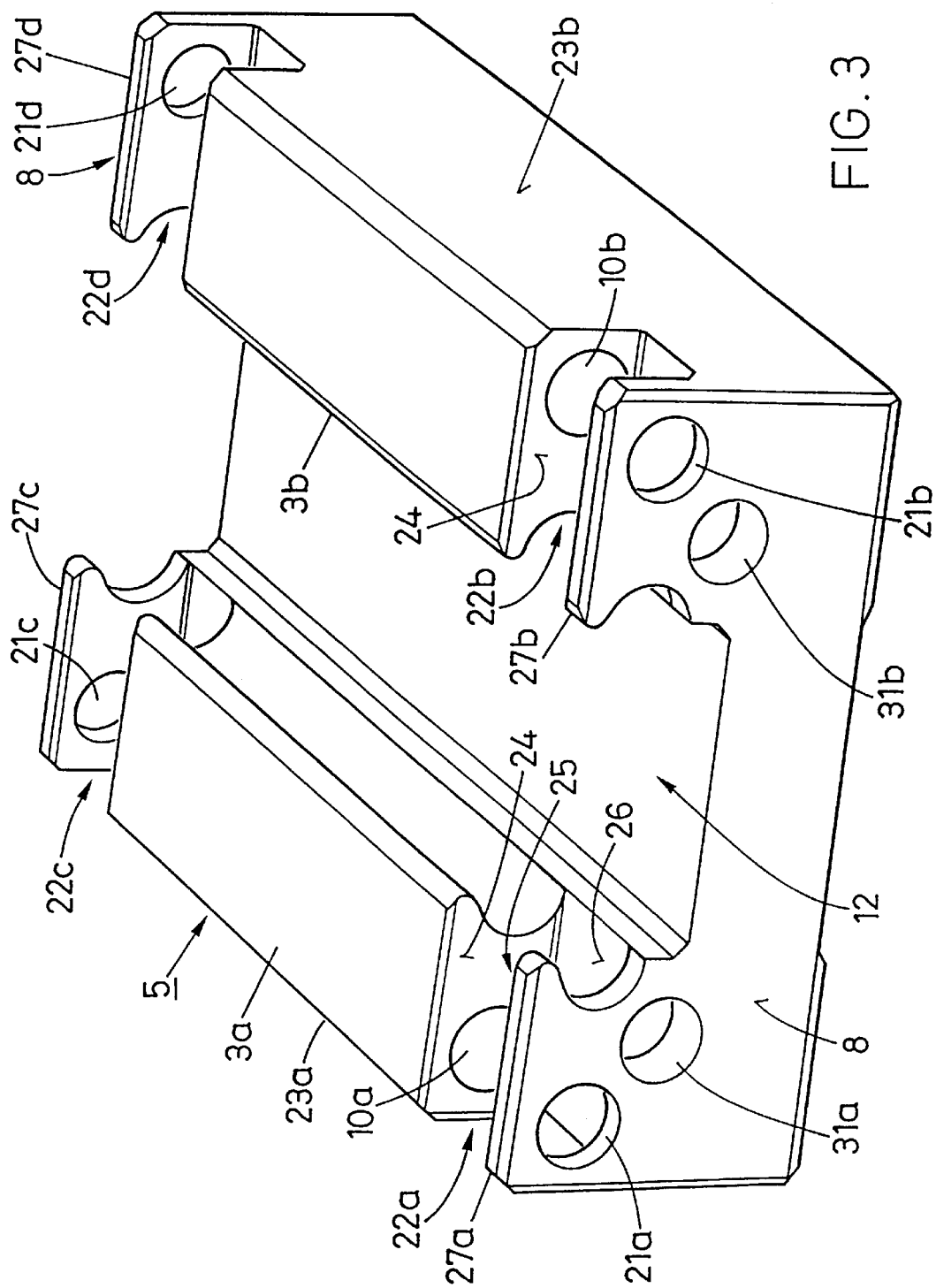
FIG. 3 shows a base body of the wagon of FIG. 1 in a perspective view.
Figure 4:
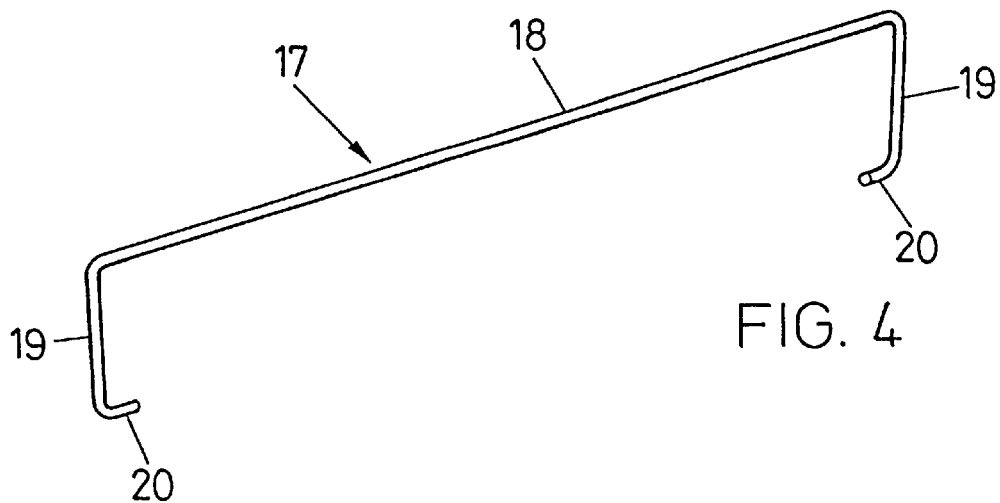
FIG. 4 shows a securing yoke of the wagon of FIG. 1.

It can be inferred from FIGS. 2 and 3 that the base body 5 of the wagon has a respective groove 22a, 22b, 22c, 22d in the region of the two ends of each leg 3a, 3b. The grooves 22a–22d are open to the respective axial recess 12 and lateral outside surfaces 23a, 23b of the wagon, and each have two level side surfaces 24, 25 and a level groove base surface 26 that is oriented orthogonally thereto.

Because the level side surfaces 24, 25, which respectively limit the grooves 22a–22d, are oriented orthogonally to the axis of longitudinal movement, the grooves 22a–22d also extend orthogonally to the recess 12. Thus, only one rib 27a–27d of comparatively smaller width is between the respective outer side surface 25 of each groove 22a–22d and the end faces 8 of the base body. Because the bores for the recesses 10a, 10b of the two return conduits are cut before the grooves 22a–22d are milled, a throughgoing recess 21a–21d is also provided in each rib 27a–27d; the longitudinal axis of the recess ends flush with the longitudinal axis of the respective return conduit. After the running surfaces of the support zone, which have a circular-arc cross-section shape, are worked into the entire length of the sides, but before the four grooves 22a–22d are cut into the insides of the legs 3a, 3b, the ribs 27a–27d also have a contour at their insides that corresponds to the carrying surfaces. Finally, a further recess 31a–31d is provided at each rib 27a–27d; the recess function will be described below.

Figure 5:
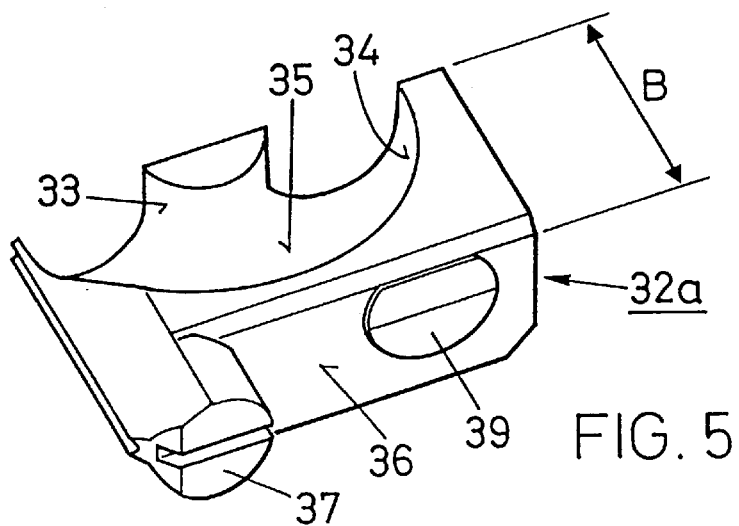
FIG. 5 is a view in perspective of a diverting body.

FIG. 5 shows a diverting body that is embodied as a one-piece insert 32a that can be inserted into two diagonally-opposite grooves 22a, 22d of the base body. A second type of insert, which is the mirror image of the illustrated insert 32a and is provided with the reference character 32b in FIG. 2, is inserted into the two other grooves 22b, 22c. The inserts 32a, 32b are preferably produced in a plastic injection-molding process.

The insert 32a of FIG. 5 has an inside guide surface 33, which extends along a circular arc of about 180°, and an outside guide surface 34, which likewise extends along a circular arc of about 180°. These two guide surfaces 33, 34 are connected to one another by a lower guide surface 35, with continuous transitions from guide surface to guide surface. At the top, the return conduit is limited by one of the groove base surfaces 26 (FIG. 2). All three guide surfaces 33, 34, 35 extend over the entire return conduit. Thus, the insert 32a contains all of the guide surfaces of the return conduit.

The insert 32a further includes a centering catch 37 at a surface 36 that is provided for making contact with the outer side surface 25 of a groove. The outside surface of the centering catch complements the running surface of the support zone, so the outside surface can be inserted into the notch 38a–38d provided at each rib due to the creation of the carrying surface. A slot is cut into an end face of the centering catch for receiving a fastening rib 19 of the fastening yoke 17.

The insert 32a also has a centering eye 39 at the same surface; this eye snaps into the respective bore 21a–21d of the rib. The respective bore 21a–21d and the corresponding centering eye 39 thus form a snap connection; a width B of the insert and a maximum height of the centering eye with respect to the surface 36 are dimensioned such that the eye can only be inserted into the groove 22a–22d due to an elastic deformation. To facilitate the insertion of the insert 32a into the respective groove 22a, 22d, the centering eye 39 can be sloped in the insertion direction by an angle of, for example, 7°. After the centering eye has assumed a position directly opposite the bore 21a–21d, it snaps into the bore. The distance of the centering eye 39 from the centering catch 37 is slightly less than the distance of the bore 21a–21d from the notch 38a–38d. Consequently, an essentially tensile stress occurs in the insert between the centering eye 39 and the centering catch 37, which centers the insert 32a relative to the running surface and the recesses 10a, 10b for the return conduits, and fixes it in the respective groove 22a, 22d.

Figure 6:
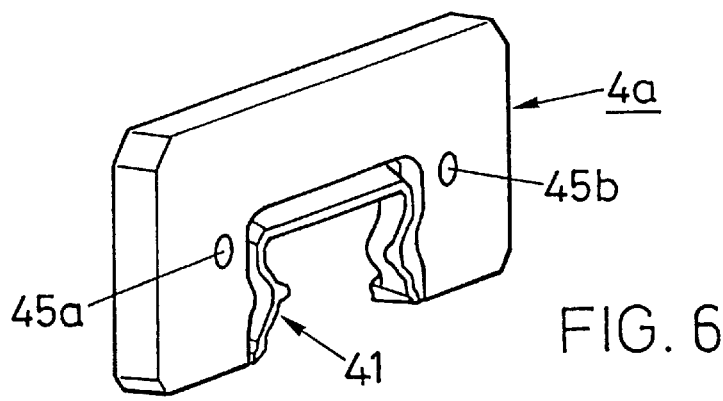
FIG. 6 is a view in perspective of a cover plate with a scraper.

FIG. 6 shows a cover plate 4a, into which a scraper 41 is integrated, which serves to remove dirt from the guide rail. The scraper contour essentially corresponds to the cross-section contour of the rail. The illustrated cover plate can be secured to either of the two end faces. The return guides and the scrapers are therefore separate components.

Figure 7:
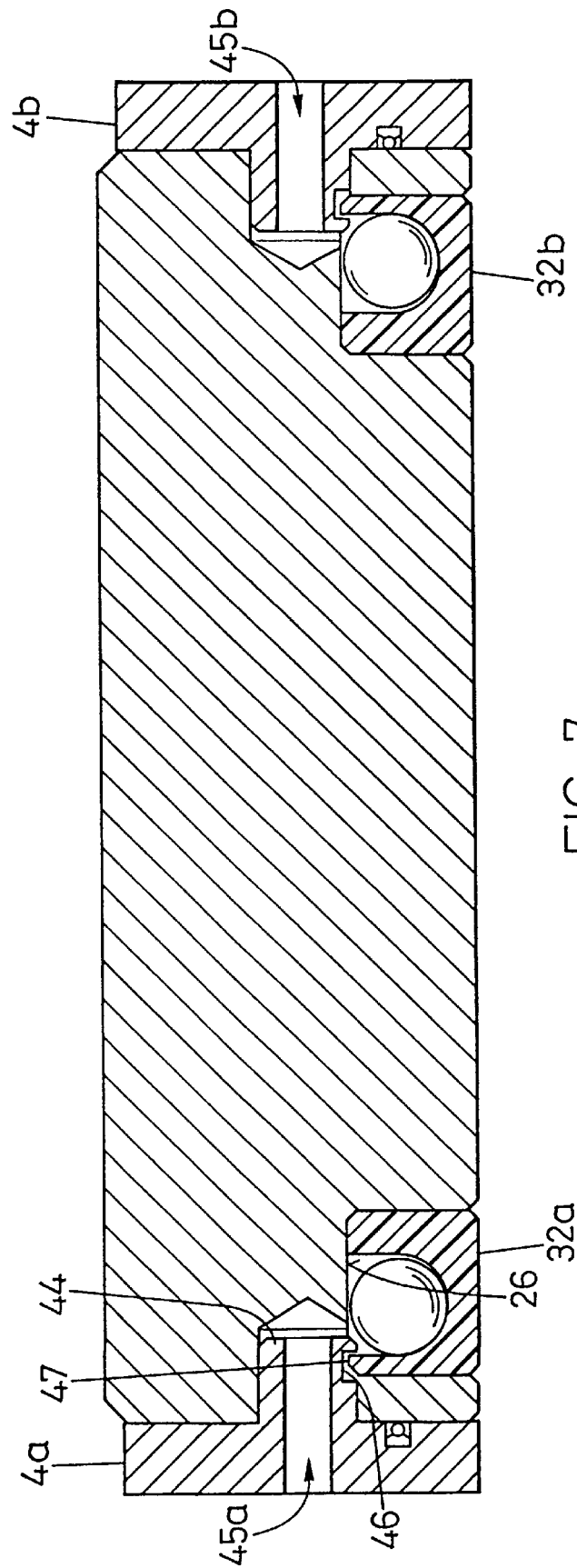
FIG. 7 shows a portion of a longitudinal section of a wagon according to the invention.

FIG. 7 shows that, in embodiments of the invention, two snap connections can be provided between the two structurally-identical cover plates 4a, 4b and each of the two inserts 32a, 32b on each side of the wagon. Each snap connection primarily serves in fastening and precisely positioning the scraper 41. The respective snap connection has a cylindrical projection 44 at the cover plate 4a, 4b on a surface facing the end face of the base body 5; a through-going lubricant bore 45a, 45b extends through this projection (see also FIG. 6), and terminates in one of the respective groove base surfaces 26. A catch 47 of the insert 32a, 32b extends through a slot 46 provided at an outside surface of the projection, thereby fixing the cover plate to the base body 5.

What is claimed is:

1. A slider of a linear-movement guide, which is provided in a rail-supported arrangement, the slider comprising:

a center segment;

two legs that respectively adjoin the center segment so that the center segment and legs form a base body and the slider has an essentially U-shaped cross section and a recess that extends parallel to the axis of longitudinal movement of the slider;

at least one roller-body track in the region of the two legs, with each roller-body track having a return conduit, a support zone and two diversion conduits that connect the return conduit and the support zone to one another, wherein at least one leg is provided with at least one groove that extends essentially transversely to the recess; and an insert having means for diverting the roller bodies inserted into the groove.

2. The slider according to claim 1, wherein the groove is limited by two side surfaces of the base body that are oriented essentially orthogonally with respect to the axis of longitudinal movement.

3. The slider according to claim 1, wherein each leg has two grooves.

4. The slider according to claim 1, wherein the means for directing the roller bodies comprises an inside and an outside guide surface of the insert.

5. The slider according to claim 1, wherein the at least one insert can be secured to the base body by a snap connection.

6. The slider according to claim 5, wherein the snap connection has a centering eye that is disposed at the insert and a recess that ends flush with the return conduit.

7. The slider according to claim 1, wherein the insert has means for centering relative to return conduit and/or the support zone of the slider.

8. The slider according to claim 1, wherein the insert is provided with a centering catch, which rests against an inside of a rib of the slider base, at which an end face of the base body (5) is located.

9. The slider according to claim 1, comprising a cover plate at which a scraper is disposed, wherein the cover plate can be secured to an end face of the base body.

10. The slider according to claim 9, wherein the cover plate can be secured to at least the insert with a snap connection.

11. The slider according to claim 9, characterized in that the cover plate is mounted, by means of a snap connection, to a rib formed by the at least one grove.

12. The slider according to claim 1, further comprising securing yoke, retaining the roller bodies in the support zone, wherein the securing yoke has a retaining rib that is disposed in the support zone, and two securing ribs that engage the end faces of the base body.

13. A roller-body track of a linear-movement guide, for the circulation of roller bodies, comprising a return conduit, a support zone extending parallel to the axis of longitudinal movement of the slider, and two diversion conduits that connect the return conduit and the support zone to one another, wherein at least one of the diversion conduits has an insert inserted into a groove that extends essentially transverse to the support zone, with the insert having means for diverting the roller bodies.

* * * * *